Figure 1:
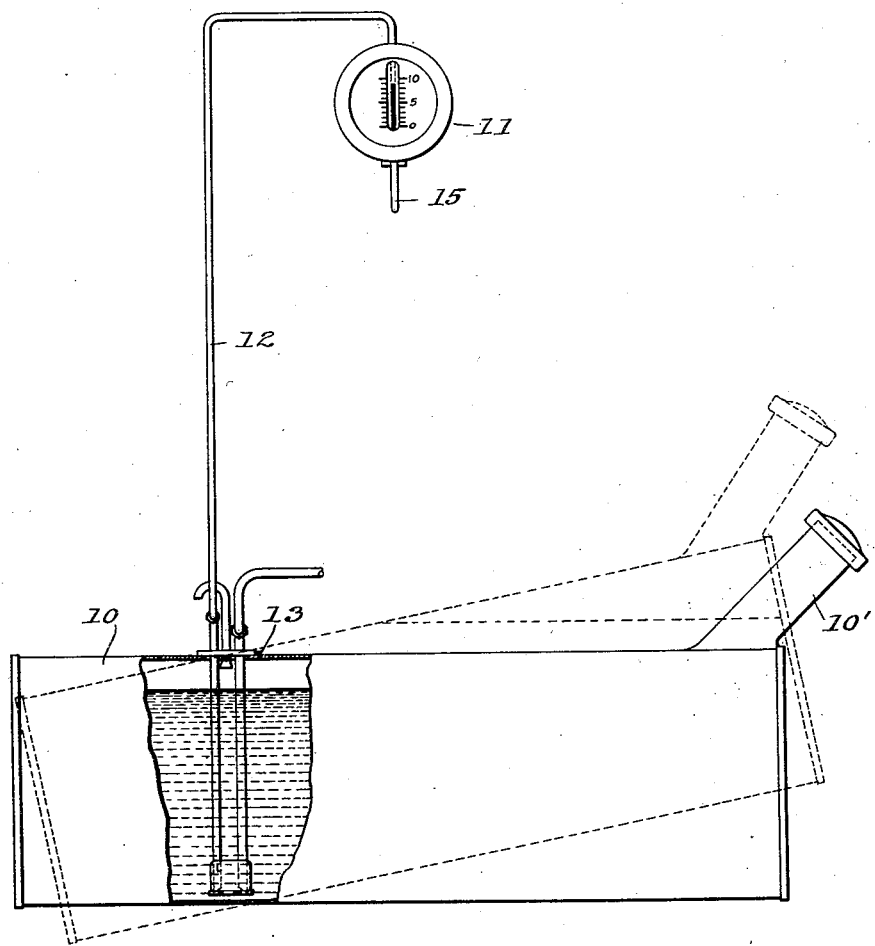

Dec. 8, 1931.  M. E. CHENEY  1,835,995
LIQUID LEVEL INDICATOR
Filed Nov. 26, 1927   2 Sheets-Sheet 1

Inventor
Moses E. Cheney
By Attorneys
Nathan & Bowman

Dec. 8, 1931.  M. E. CHENEY  1,835,995
LIQUID LEVEL INDICATOR
Filed Nov. 26, 1927  2 Sheets-Sheet 2
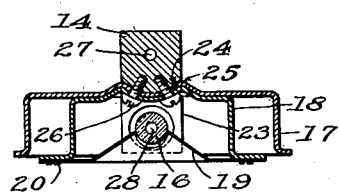
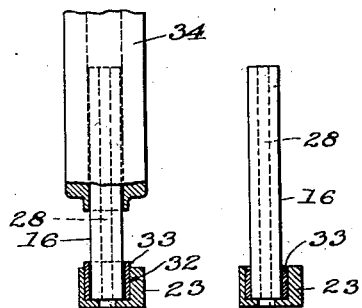
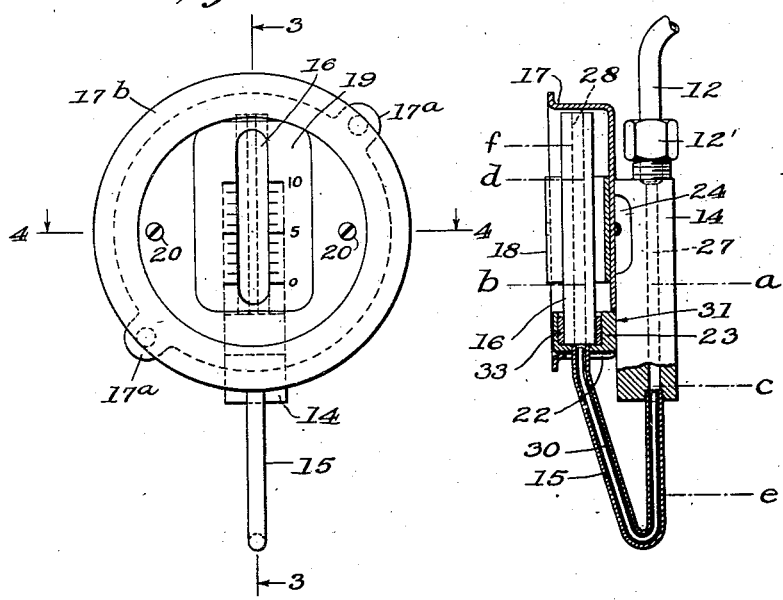
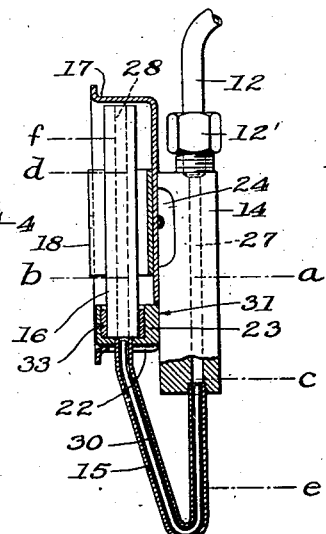
Inventor
Moses E. Cheney
By Attorneys
Nathan & Bowman Patented Dec. 8, 1931

1,835,995

UNITED STATES PATENT OFFICE

MOSES E. CHENEY, OF TOLEDO, OHIO, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

LIQUID LEVEL INDICATOR

Application filed November 26, 1927. Serial No. 235,846.

This invention relates to improvements and means for indicating the depth of liquid in a covered receptacle and has certain advantageous features which make it particularly adaptable to the measuring of the amount of gasoline in the storage tank of an automobile. In such arrangements, the ordinary construction consists of a gasoline tank mounted on the rear portion of the auto, a U-tube indicator mounted on the dash with an intervening air column connecting it to the lower portion of the gasoline tank; the position of the liquid piston in the U-tube being dependent upon the height of liquid in the tank. The instrument in such constructions usually includes a transparent tube having an open upper end within which the liquid piston is adapted to rise in accordance with the height of the liquid in the tank.

It is a comparatively simple matter to arrange the parts so that, under normal conditions the variation of height in the indicator tube is confined to definite limits which are easily provided for in a relatively small gauge and length of indicator tube. However, such instruments must be designed to provide for certain abnormal conditions, whereby the depth is greatly increased over the normal capacity of the tank in its level position and in cases where the liquid extends into the filler spout and other abnormal conditions, such as sudden surges of the liquid in the tank whereby the pressure imparted to the air column and likewise the liquid piston is greatly increased. Such increased pressures may be sufficient in many cases to cause the liquid piston to overflow the indicator tube unless provision is made therefor. Heretofore in order that the length of indicator tube may be maintained within satisfactory dimensions it has been common to provide a reservoir at the upper end of the indicator tube.

This invention is designed to provide for such abnormal conditions with a construction more simplified and economical to build than prior devices and includes in the main a restricted opening extending for a substantial distance through the U-tube whereby the liquid displaced therefrom by abnormal pressures is of reduced volume and therefore requires less overflow capacity in the indicator tube.

In conjunction with the above improvements, novel means have been conceived and a practical embodiment thereof designed for forming the restricted portion of the tube, which consists of the insertion therein of a wire rod which in addition to providing a simple and economical construction also has the additional function of acting as a resistance to sudden surges of liquid, which resistance is due to the high frictional qualities of the restricted opening accomplished by the insertion of the wire rod.

As another feature of this construction such an arrangement permits of wires of different sizes being inserted in accordance with the different conditions arising when tanks of different capacities and depth are used, thereby adapting the indicating instrument to more universal use.

Another difficulty encountered in installations of this kind results from the fact that the tube in its mounting on the dash is subjected to being tilted in accordance with the position of the auto, resulting in inaccurate readings of the indicator due to the difference in the heights of the respective legs of the U-tube. The simplified construction provided herein is such as to enable the legs of the tube to be brought closer together thereby reducing the errors resulting from the tilting of the indicator tube. At the same time the construction enables the assembling of the parts to be accomplished more easily and the resulting instrument being more compact and rigid than previous devices of this nature.

As a further object in conjunction with the simplified, rigid and compact structure, a method of assembling such parts has been conceived relating particularly to the means for securing the glass indicator tube in its support and forming leakproof joint between the bore of the glass indicator tube and the connecting leg of the U-tube.

A common practice heretofore has been to insert the glass tube in a holding body member and pour a molten liquid around the inserted end allowing it to solidify. It was found, however, that such cast materials were often porous, permitting the fluid to seep thereinto, thereby destroying the accuracy of the instrument. The present method contemplates the provision of a malleable ring which is tamped tightly into place, around the inserted end of the glass tube. The metallic supporting member and the adjacent end of the metallic U-tube are then easily secured together to form a joint free from leaks.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a substantially diagrammatic view, showing the indicator connected to a liquid receptacle. Fig. 2 is an enlarged front elevational view of the indicator instrument proper. Fig. 3 is a vertical cross-sectional view taken on the line 3—3 of Fig. 2. Fig. 4 is a horizontal sectional view taken on the line 4—4 of Fig. 2. Fig. 5 is a detail view illustrating the method of assembling the transparent tube in a holding body, and Fig. 6 is a view similar to Fig. 5 showing the finished product.

The invention is shown disclosed in an organization suitable for application to an automobile and includes a tank or closed receptacle 10, having the filling spout 10′, such receptacle being commonly mounted on the rear end of an automobile, and an indicating instrument 11 adapted to be mounted on the dash and having a pipe 12 connecting it with the lower part of the tank 10 through the intermediary of a fitting 13. Such fitting may be of any suitable type wherein the liquid is adapted to enter the lower end of the tub 12 and exert a pressure on the air column confined therein; such pressure being in accordance with the depth of the liquid in the tank 10.

The essential features of the indicator instrument proper comprise a U-tube which includes the body member 14, lower bent tube portion 15, and the transparent indicator tube 16. The air pipe 12 is connected to the body portion 14 by a suitable pipe joint 12′. The tubular indicator 16 is mounted within the casing 17 having therein the bracket 18 of U-shaped cross-section upon which is secured the graduated circular plate 19 by means of screws 20. The lower portion of the casing 17 has an opening 22 therein extending upwardly through a portion of the back wall adapted to receive the supporting block or body member 23, within which the glass indicator tube 16 is inserted. Projecting ears 17ª afford means for mounting the instrument on its support which support may include the front annular ring 17ᵇ for securing the indicating face in position.

Fig. 4 illustrates most clearly a construction having features of particular advantage in an instrument of this type. The surface of the body member 14 has a convex portion 24 adapted to receive a similarly shaped concave portion 25 of the outer casing and likewise a similarly shaped central portion of the bracket 18. Screws 26 may be conveniently inserted at either side of the indicator tube to draw the casing into firm engagement with the supporting body member; an important feature of this construction resides in the convenience with which the parts may be assembled as compared with a construction in which, for example, the contacting surfaces are made flat and the securing screws are accordingly inserted at right angles with the contacting surfaces, such assembling being difficult because of the position of the glass tube in the front thereof. If, in order to overcome this disadvantage, the glass tube were separated from the back wall by a sufficient distance to enable the screws to be easily assembled then such an arrangement would result in the bores 27 and 28 being widely separated and causing inaccurate readings of the indicator in case the instrument were tilted about an axis perpendicular to the paper in Fig. 3. The arrangement shown permits of a more convenient compact and rigid construction of the parts and one in which the bores are brought much closer together.

The construction includes a wire rod 30 inserted within the tube portion 15 to occupy a large part of the cross-sectional area thereof, but not to entirely close the opening therethrough. It is obvious that this is not the only way in which the cross-sectional area may be reduced.

The operation of the structure is somewhat as follows: A liquid piston occupies a position in the lower part of the U-tube extending up into the transparent tube 16 to a point adjacent the graduations and also up into the bore 27 to a point substantially above the joint between the tube 15 and the body member 14. The initial position of the liquid piston for an empty tank would be that in which, for example, the liquid piston extended up the bore 27 to a point $a$ and in the opposite leg of the U-tube to the point $b$ corresponding to zero. Upon the tank being filled the liquid piston would be forced down and around to the points $c$ and $d$; the latter point corresponding on the scale to the full mark or 10 as shown herein. Such an operation is well known in instruments of this type.

The novel features of this invention include the provision of a restricted portion of the pipe 15 below the point c, whereby additional pressure exerted on the liquid piston causes it to flow around the pipe 15 but in doing so, owing to the reduced volume thereof, the liquid does not rise a corresponding amount in the indicator tube 16. As an example of such abnormal condition in the operation of an automobile the tank being already full may be caused to assume a position such as is shown in dotted lines in Fig. 1, or in filling the tank the projecting spout 10' may be filled to overflowing, or both of the above conditions may exist. As a further condition an increased pressure may be imparted to the air column by reason of sudden surge of the liquid, resulting from rapid change of position of the receptacle 10. As a result of such abnormal condition the liquid piston may be forced down to the point e, for example, which would be approximately double the increased pressure from a to c. With a uniformly sized opening in the right leg of the U-tube, shown in Fig. 3, the liquid in the glass tube would rise above d an amount equal approximately to a distance b d, that is a sufficient distance to overflow the glass tube, but with the restricted portion of the U-tube it is apparent that the increased height of the liquid in the glass tube would rise only to some point, such as that indicated by f.

The increased rise in the glass tube 16 would naturally be dependent upon the relative cross-sectional areas of the openings in the tube 15 and the bore 28. This, in turn, it may be seen, would be dependent upon the particular size of wire rod 30 which was utilized, which wire rod may be of selected approximate sizes in accordance with the conditions which must be provided for; as, for example, if the tank were of greater depth, the scale reading on the glass indicator would be of greater length, reducing thereby the length of tube above the full mark on the scale and the wire rod 30 would be required to be made larger in order that the liquid would not rise in the glass tube above the full mark to the extent of the previous case.

The wire rod also performs functions which makes its use of great advantage because of the greater resistance to the flow of liquid offered by the increased area of frictional surface within the tube 15. Such frictional resistance renders the gauge more steady and nullifies, to a large extent, any surges in the level of the liquid resulting in sudden increased pressures on the air column and liquid piston.

The construction conceived and adapted herein offers convenience in the manufacture thereof; as for example, the body member 14 and the supporting member 23 may be separately and rapidly formed in automatic screw machines and thereafter assembled by soldering the surface 31. Such a construction also permits the convenient assembling of the glass tube 16 and the member 23, which operation is accomplished in a simple manner, now to be disclosed, resulting in a tighter joint entirely free from any danger of leakage. The method by which this glass tube is assembled to the supporting member 23 and secured to the pipe 15 to form a continuous passage for the liquid piston, consists of forming the counterbore 32 in the member 23, inserting therein the ring 33 composed of some soft material, such as lead, which may be easily pressed into close contact with the adjoining surfaces. Pressure is applied to the upper surface of the ring 33 to tamp or force it into tight engagement with the joint surface by means of a sleeve member 34 operable in any desired manner as e. g. a punch press. The member 23 and pipe 15 both being of a metallic substance may be easily joined together in some such manner as screwing the pipe 15 within the opening 35 or soldering it in position to thereby result in a fluid tight joint between the two elements of the U-tube. The soft ring 33 being pressed into place is entirely free from pores or openings such as would be liable to occur in case such ring were cast therein.

The above assembled construction co-operates to form a very compact rigid indicator instrument and capable of operating in a most reliable and accurate manner.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. An indicator instrument combining a body member having a bore therein; a casing mounted thereon; a liquid receiving indicator tube mounted in said casing; a U-tube connecting said indicator tube with the bore in said body member substantially parallel to said indicator tube, the adjoining surfaces of said casing and body member being arc-shaped.

2. An indicating instrument comprising a body member having a bore therein and a convexed portion on its outer surface; a tubular indicator member mounted closely adjacent said curved portion and substantially parallel to said bore; means connecting said indicator member and said bore to form a U-tube; a casing for said indicator member having a supporting wall portion adapted to fit said convexed portion; and securing means therefor closely adjacent said indicator member.

3. An indicator instrument combining U-tube means comprising a body member having a bore therein, a liquid indicator tube arranged substantially parallel to said bore, and pipe means connecting said bore and tube; and a casing for said indicator tube mounted on said body member the adjoining surfaces being curved into said casing whereby screw fastening means may be conveniently inserted through said casing tube and the tube and bore arranged closely adjacent, and screw means fixedly mounting the casing on the body member.

4. An indicator instrument characterized as having a body member with a vertical bore therein and a casing having a concaved portion, said casing being mounted on said body member the combination of an indicator tube adjacent to and substantially parallel with the bore of said body member with a U-tube connecting the bore of said body member with said indicator tube, the surface of said body member having a convexed portion to receive the concaved portion of said casing whereby screws may be conveniently inserted through the casing without interference from the indicator tube, and screws fixedly mounting the casing on the body member.

5. In combination with a tank for containing a liquid, an upright indicating tube comprising a graduated portion and an overflow portion above said graduated portion of less capacity than the graduated portion, an upright body member having a bore, an upright intermediate member of U-shaped character whose capacity per unit of length is less than the capacity of said bore, the said intermediate member being connected both to the lower part of the graduated portion and to the lower portion of the bore of the said body member, a pipe connecting the upper portion of the body member with the tank and communicating with the liquid at the maximum depth to be indicated, an indicating element in said U-tube responding to variations of the level of the liquid in said tank, the level of said indicating element extending to the bore of the body member at the initial full position of the liquid level of said tank but dropping from said bore into the U-shaped intermediate member whenever an unusual condition of the liquid in the receptacle occurs after said receptacle is filled, thereby causing a limited amount of the indicating element to flow into the overflow portion of the tube.

6. The combination of a liquid tank with an upright U-tube member, a pipe connecting the upright U-tube member with the tank, an indicating element in said U-tube and being movable by variations of the level of the liquid in said tank, said upright U-tube member having an overflow portion, a graduated indicating portion, an intermediate portion of U-shape and a portion having a bore connected to one end of the intermediate member, the intermediate member being of less capacity per unit of length than said bore and the indicating element being arranged to extend normally into said bore, but capable of falling below said bore and into the intermediate member during abnormal conditions of the liquid level of said tank, thereby causing a reduced amount of flow of the indicating element through said graduated portion.

7. The combination of a liquid tank with an indicating tube member, a pipe connecting said tube member with the tank, said pipe and indicating tube containing an indicating element movable by variations of the level of the liquid in said tank, said indicating tube member having a graduated portion, an overflow portion above said graduated portion, an intermediate portion of U-shape and means forming a bore connected thereto, the intermediate member being of less capacity per unit of length than the bore and the level of the indicating element being arranged normally to be below said overflow portion in one leg of said indicating tube and above the intermediate portion in the other leg of said tube and capable of dropping in said last mentioned leg to a point below the said bore and simultaneously mounting into said overflow portion during abnormal conditions of the liquid level of said tank.

In witness whereof, I hereunto subscribe my name.

MOSES E. CHENEY.